United States Patent Office 2,838,554
Patented June 10, 1958

2,838,554

PROCESS FOR MAKING ORGANOTIN MALEATES

Carl R. Gloskey, Avenel, N. J., assignor to Metal & Thermit Corporation, New York, N. Y., a corporation of New Jersey No Drawing. Application April 15, 1954
Serial No. 423,535

9 Claims. (Cl. 260—429.7)

The present invention relates to a process of preparing substantially anhydrous and pure organotin maleates of uniform properties.

A prior method of preparing organotin maleates is called the fusion process. This process has many disadvantages, the major difficulties residing in the production of final products having inconsistent properties. Variations in the heating cycle during the manufacturing process affect the melting point and solubility of the final product, thereby yielding products of differing inherent properties. This process also fails to provide an adequate means for removal of process-line contamination, and consequently results in the appearance of black specks in the maleate stabilized vinyl film.

In order to avoid the effects of variations in heat history the organotin oxide may be reacted with maleic acid or anhydride in water medium. While this process avoids overheating it has no means for removal of processline contamination. Furthermore, because organotin maleates tend to hydrolyze, it is necessary to provide maleic acid or anhydride in great excess during the reaction and to attempt to remove the excess afterward. Drying of the product is difficult.

Accordingly, an anhydrous process of preparing organotin maleates has now been developed which overcomes the difficulties encountered in the prior method. This process utilizes stoichiometric amounts of maleic acid (preferably in anhydride form), thereby reducing the consumption rate of said acid 50% and eliminating the necessity of subsequent removal of said excess acid from the final reaction product. This has further resulted in the production of maleates containing no free acid.

A feature of this process is the use of substantially anhydrous conditions during the reaction of the organotin oxide with the maleic anhydride or acid. This has eliminated the presence of water in the final product and the subsequent necessity of removing the water from the product. The use of low temperatures during the instant process has eliminated the variations in the melting point and solubility properties of the maleates occurring during the old fusion process. The ease with which the present process can be controlled has resulted in a greater volume of production of the final product. The present process allows for the removal of process-line contamination by filtration or by other suitable means.

In accordance with the present invention, the anhydrous organotin maleates are prepared by reacting substantially stoichiometric amounts of maleic anhydride and an organotin oxide in the presence of an inert solvent such as toluene solvent. More specifically, the present anhydrous process comprises reacting stoichiometric amounts of maleic anhydride and organotin oxide at a temperature of about 85°–100° C. in the presence of toluene solvent, removing any water and the toluene, and recovering a substantially anhydrous, pure organotin maleate. Water is present when wet organotin oxides are employed or when maleic acid is used instead of the anhydride, otherwise there is none. The oxide reactant is preferably added to the toluene solution of the maleic anhydride over a period of ½ to 1 hour, this period being determined by the speed of dissolution of the oxide in the toluene solution.

The material balance for a typical run to produce dibutyl tin maleate by the process of this invention is as follows:

Reactants.—2000 lbs. dibutyl tin oxide (.804 lb. moles); 800 lbs. maleic anhydride (.811 lb. moles).

Product.—2775 lbs. dibutyl tin maleate (.800 lb. moles).

Losses.—25 lbs.

The above material balance clearly illustrates the use of stoichiometric quantities of reactants as well as the obtention of stoichiometric yields of the maleate. Although dibutyl tin oxide was used to illustrate the above reaction, other organic radicals may be substituted for the butyl radicals. Suitable organic radicals may be other alkyl groups such as ethyl, propyl, hexyl, octyl, decyl, etc.; aryl groups such as phenyl, tolyl, etc.; aralkyl groups such as benzyl or phenylethyl. Substituted aliphatic and aromatic radicals as well as unsaturated aliphatic radicals may be substituted for the butyl group in the organotin oxide reactant.

Another desirable feature of this invention resides in the removal of the toluene solvent from the organotin maleate by stripping the toluene under a vacuum of about 40 mm.–100 mm. Hg and at a maximum temperature of about 110° C. or 230° F. over a period of time not to exceed about 1½ hours. The maximum temperature of 110° C. and the maximum time period of 1½ hours of this stripping step is critical since it has been found that excessive or prolonged heating results in the formation of higher polymer maleates rather than the simple organotin maleates of this invention. The toluene stripped from the reaction product may be reused. Insoluble solid contaminants may be eliminated from the product by filtering either the toluene solution or the stripped maleate.

The toluene stripped maleate may be crystallized at a temperature of about 25° C.

The maintenance of substantially anhydrous conditions during the process is a feature of this invention. A maximum of about 0.3% water has been found in the maleate products resulting from the present anhydrous process. Although dry organotin oxide is preferred, the wet oxide may also be used. However, when using the wet oxide, the reaction proceeds very rapidly and a great amount of heat is evolved resulting in a loss in the toluene solvent.

The organotin maleates are obtained in almost theoretical yields of about 97.5–99.5%. These substantially theoretical yields are indicative of the non-necessity of the use of an excess of either reactant, the total amount of reactants being substantially completely utilized in the formation of the final reaction product.

The following examples are further illustrative of the present invention and it will be understood that the invention is not limited thereto:

EXAMPLE I

*Preparation of dibutyl tin maleate*

42 lbs. of maleic anhydride was dissolved in 30 lbs. toluene at 65° C. (150° F.). 103 lbs. dibutyl tin oxide was added in small portions over a period of ½ hour while allowing the solution to clear up after each addition. After all the oxide was added, the heat was raised to 230° F. and subjected to a vacuum of 100 mm. for a period of 45 minutes in order to remove the toluene. The resultant product was air purged for 3 minutes, poured into trays, and aged 2 days, after which it was pulverized twice.

The average yield of dibutyl tin maleate in a number of runs was 141.8 lbs. which calculates to 97.8% of the theoretical yield.

EXAMPLE II

*Preparation of dibutyl tin maleate*

75 gms. of toluene and 60 gms. maleic anhydride were blended and heated to 100° C. 200 gms. of dibutyl tin oxide containing 25% water was added slowly thereto with agitation and the temperature reduced to 90° C. Considerable foaming existed during said addition and the temperature was again reduced to 80° C. whereby the foaming stopped. Refluxing started at 85° C. and the water was removed as the temperature rose to 105° C. Toluene was removed by applying a vacuum of 42 mm. at 100° C. The stripped product was aged 24 hours whereupon a slight stickiness was observed only on the surface of the solid which crystallized as a result of said aging. The product was pulverized yielding a white powder having slight traces of tackiness.

While the invention has been described with reference to various examples and embodiments, it will be apparent to those skilled in the art that various modifications may be made and equivalents substituted therefor, without departing from the principles and true nature of the present invention.

What is claimed by Letters Patent is:

1. A method for preparing anhydrous hydrocarbontin maleates which comprises reacting substantially stoichiometric amounts of maleic anhydride and a hydrocarbontin oxide selected from the class consisting of alkyltin oxides, monocyclic hydrocarbonaryltin oxides and monocyclic hydrocarbonaralkyltin oxides under substantially anhydrous conditions and in the presence of an inert organic solvent as reaction medium and recovering substantially anhydrous hydrocarbontin maleate.

2. A method according to claim 1, wherein the reaction is carried out at a temperature of about 85–100° C.

3. A method according to claim 2, wherein the reaction is carried out over a period of about ½ to 1 hour.

4. A method according to claim 3 wherein said inert organic solvent is stripped from the reaction product and said hydrocarbontin maleate is recovered.

5. A process according to claim 4, wherein said inert organic solvent is toluene.

6. An anhydrous method of preparing a substantially pure, anhydrous hydrocarbontin maleate which comprises reacting under substantially anhydrous conditions substantially stoichiometric amounts of maleic anhydride and a hydrocarbontin oxide selected from the class consisting of alkyltin oxides, monocyclic hydrocarbonaryltin oxides and monocyclic hydrocarbonaralkyltin oxides at a temperature of about 85–100° C. in the presence of toluene as a reaction medium, stripping the toluene from the reaction product under vacuum and at a maximum temperature of about 110° C. over a period of time not to exceed about 1½ hours and recovering said hydrocarbontin maleate.

7. A method according to claim 6, wherein said hydrocarbontin maleate is crystallized and recovered from said reaction product subsequent to the stripping of the toluene from the reaction mixture.

8. An anhydrous method of preparing a substantially pure, anhydrous dibutyl tin maleate which comprises reacting substantially stoichiometric amounts of maleic anhydride and dibutyl tin oxide, at a temperature of about 85–100° C., in the presence of inert solvent, stripping the solvent from the reaction product under vacuum and at a maximum temperature of about 110° C. over a period of time not to exceed about 1½ hours, crystallizing the reaction product, and recovering dibutyl tin maleate.

9. A process according to claim 8, wherein said inert solvent is toluene.

References Cited in the file of this patent

UNITED STATES PATENTS

| | | |
|---|---|---|
| 2,150,349 | Van Peski et al. | Mar. 14, 1939 |
| 2,267,777 | Yngve | Dec. 30, 1941 |
| 2,344,002 | Rugeley et al. | Mar. 14, 1944 |
| 2,560,034 | Eberly | July 10, 1951 |
| 2,583,084 | Burt | Jan. 22, 1952 |
| 2,648,650 | Weinberg et al. | Aug. 11, 1953 |
| 2,744,876 | Ramsden | May 8, 1956 |